United States Patent
Seiler

(10) Patent No.: US 10,127,627 B2
(45) Date of Patent: Nov. 13, 2018

(54) MAPPING GRAPHICS RESOURCES TO LINEAR ARRAYS USING A PAGING SYSTEM

(71) Applicant: Intel Corporation, Santa Clara, CA (US)

(72) Inventor: Larry Seiler, Boylston, MA (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 14/862,634

(22) Filed: Sep. 23, 2015

(65) Prior Publication Data

US 2017/0084000 A1    Mar. 23, 2017

(51) Int. Cl.
| | | |
|---|---|---|
| *G06T 1/60* | (2006.01) | |
| *G06F 12/1009* | (2016.01) | |
| *G06F 12/1027* | (2016.01) | |
| *G06F 7/76* | (2006.01) | |

(52) U.S. Cl.
CPC .............. *G06T 1/60* (2013.01); *G06F 7/76* (2013.01); *G06F 12/1009* (2013.01); *G06F 12/1027* (2013.01); *G06F 2212/1016* (2013.01)

(58) Field of Classification Search
None
See application file for complete search history.

(56) References Cited

U.S. PATENT DOCUMENTS

| | | | | |
|---|---|---|---|---|
| 8,072,463 | B1 * | 12/2011 | Van Dyke | G06F 12/10 345/540 |
| 2009/0244074 | A1 | 10/2009 | Montrym | |
| 2011/0087840 | A1 * | 4/2011 | Glasco | G06F 12/08 711/118 |
| 2012/0147028 | A1 | 6/2012 | Frisinger | |
| 2014/0019732 | A1 | 1/2014 | Toll | |
| 2014/0164703 | A1 | 6/2014 | Kuesel et al. | |
| 2015/0002523 | A1 * | 1/2015 | Zeng | G06F 21/71 345/522 |
| 2015/0287166 | A1 * | 10/2015 | Cerny | G02B 27/0172 345/423 |
| 2015/0334403 | A1 * | 11/2015 | Smithers | G06T 9/00 345/555 |
| 2016/0098813 | A1 * | 4/2016 | Kottilingal | G06F 12/1036 345/531 |

OTHER PUBLICATIONS

"Larrabee: A Many-Core x86 Architecture for Visual Computing", by Larry Seiler et al., IEEE Micro, Jan./Feb. 2009, pp. 10-21 (Year: 2009).*
U.S. Appl. No. 14/751,843, filed Jun. 26, 2015 entitled "A 64KB Page System that Supports 4KB Page Operations," (33 pages).
PCT Search Report and Written Opinion dated Nov. 25, 2016 in corresponding PCT/US2016/047964 (13 pages).

* cited by examiner

Primary Examiner — James A Thompson
(74) Attorney, Agent, or Firm — Trop Pruner & Hu, P.C.

(57) ABSTRACT

Memory resources that are stored in GPU-specific formats may be accessed as linear arrays by CPU applications. Shared virtual memory (SVM) support enables closer CPU/GPU interaction. This creates a need to efficiently access graphics data using SVM. CPU page mapping and memory management hardware may perform the address/data swizzling and tiled rendering translations required for GPU memory formats. As a result, CPU applications can access GPU resources as if they are stored in a linear array, while also using shared virtual memory.

30 Claims, 15 Drawing Sheets

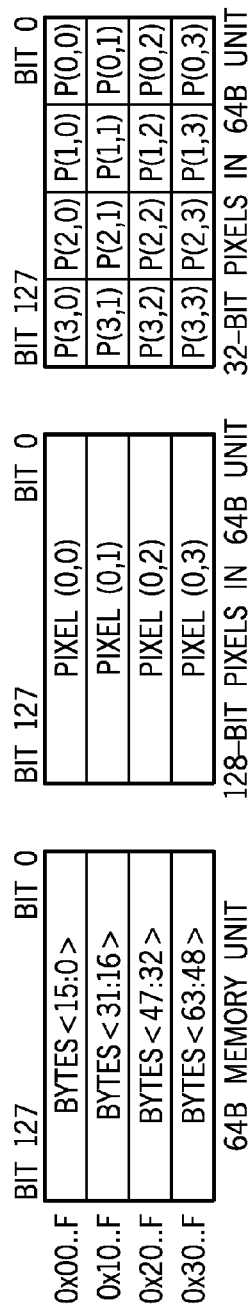
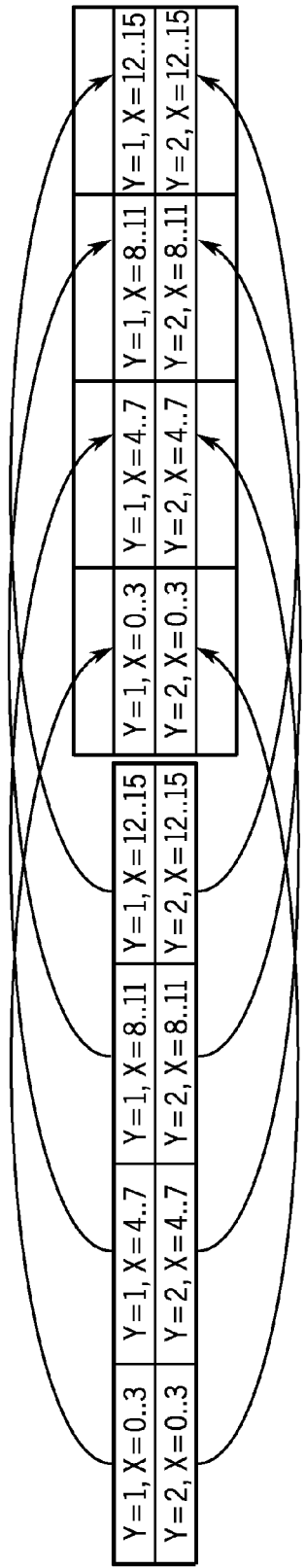
FIG. 1
FIG. 2

MAPPING GRAPHICS RESOURCES TO LINEAR ARRAYS USING A PAGING SYSTEM

BACKGROUND

Graphics processing units (GPUs) typically access arrays of pixels using (X,Y), (X,Y,Z) or (X,Y,sample#) coordinates. Memory addresses are computed by interleaving or "swizzling" or rearranging low order bits of the coordinate indices, as specified by a resource descriptor. Each cacheline stores a two-dimensional (2D) (or in some cases 3D) region within the pixel array, which greatly reduces the bandwidth needed for graphics rendering operations.

Explicitly managing the working set is vital for graphics applications, since faulting in pages would cause unacceptable screen glitches. GPUs now support a technique called "tiled resources" (in DirectX) or "sparse textures" (in OpenGL). This provides a new user-space page mapping table, so that applications can select 64 KB "tiles" of data to map into process virtual address space (or into dedicated graphics memory). Accesses are translated through this user-mode table before any operating system (OS)-managed page translation. Unmapped tiles read as zero and ignore writes, rather than faulting.

At present there is no means to fully support tiled resources when accessing a graphics resource from the central processing unit (CPU). The only available mechanism is to access individual mapped tiles after performing the tile address translation in application code.

At present there is also no practical way to allow applications to access swizzled data as if it were a linear array. The only mechanisms available to applications are to copy the data while reordering it or to write the application to explicitly interleave the array indices, which means that the application software must know what swizzle format is being used. A third method called "aperture registers" translates swizzled addresses in hardware but this method is very slow and only usable by the driver due to the limited number of swizzled surfaces that can be supported at once, e.g. six.

BRIEF DESCRIPTION OF THE DRAWINGS

Some embodiments are described with respect to the following figures:

FIG. 1 is a depiction of standardized swizzle formats for four scan lines (left column) in a 64 B memory unit and showing two different pixel sizes, 128 bit and 32 bit;

FIG. 2 is a depiction of a linearized address to map to the correct physical page according to one embodiment;

DETAILED DESCRIPTION

Figure 3:
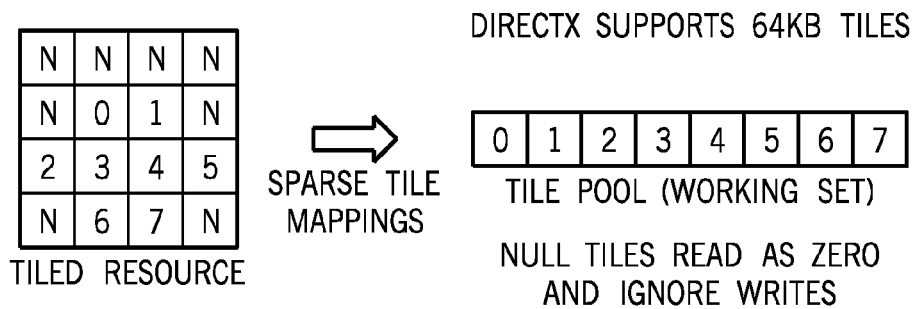
FIG. 3 is a depiction of a titled resource mapped to slots in a tile pool according to one embodiment.

CPU applications store arrays of data in linear form, that is, for an (x,y) array, all of the data for a given value of Y is stored, then the data for the next value of Y. Shared virtual memory (SVM) support enables closer CPU/GPU interaction by allowing CPU applications to directly access memory resources that are stored in GPU-specific formats. This creates a need to efficiently access graphics data using SVM in the linear array order that is easy for CPU applications to use. This method may also be used for 3D arrays of data.

Tiled resource translation reduces the working set by using sparsely mapped resources and by mapping resources into the same address space, under application control. Therefore, tiled resource access is advantageous. A multi-vender standard for the translation table required to implement tiled resources, as well as an efficient implementation, may be provided in some embodiments.

There are two key differences between how CPUs and GPUs store arrays of data. The first is that GPUs interleave the X and Y address bits, so that contiguous locations in memory store data for multiple Y values as well as multiple X values. The second is that GPUs support an extra level of address translation, referred to as Tiled Resources. This allows applications to map portions of a memory resource to process virtual addresses, which the operating system in turn maps to physical addresses. This allows applications to more directly control their memory footprint, which is a critical consideration for real time applications such as 3D graphics.

CPU page mapping and memory management hardware may perform the address/data swizzling and tiled rendering translations required for GPU memory formats. As a result, CPU applications can access GPU resources as if they are stored in a linear array, while also using shared virtual memory.

Linearization may be accomplished by means of a swizzle-format field that is stored in the page table, address/data swizzling logic in the memory access path, and an additional page table walk. The linearization process uses the following steps:

A) A linearization page table walk maps a virtual address for a linearized version of the resource to a virtual page that contains the swizzled data, prior to the normal walk. (For dedicated graphics memory, it could linearize to physical addresses.)

B) Caches near the processor store this linearized data with a physical address that is tagged with the swizzle-format field. A linearized cacheline may store data from multiple swizzled cacheelines.

C) Address/data swizzling occurs at a point in the cache hierarchy with no write-back caches between that point and the processor. The cacheline tags described in step B are used to perform the data conversion and ensure cache coherency despite address aliasing.

D) A user-mode tiled resource translation may be supported using an additional walk that occurs after the linearization walk. This walk produces a virtual address within a "tile pool," which is part of the application-controlled working set.

Translation lookaside buffers (TLBs) may efficiently store the results of multiple page walks. Invalidating the result of one walk leads to invalidating prior walks used to generate that TLB. This method may also be applied to the extra walk for guest/host virtualized accesses.

Another alternative to the linearization process described above is to provide partial linearization, where 64 B or larger units remain in swizzled form. This provides a performance benefit because individual 64 B cacheline addresses do not require data swizzling, at the cost of the application needing to understand the 2D arrangement of data within a 64 B or larger unit of memory. Graphics blocks can also benefit by using either fully linear data or partially linearized data, depending how much 2D/3D locality each GPU memory client requires. This minimizes the amount of swizzling logic that must be designed into the GPU memory clients in some embodiments.

CPU applications can access an arbitrary number of graphics memory resources that are stored in swizzled formats, since the swizzled memory resources are specified in the page table instead of using a limited resource such as aperture registers. These resources appear to the CPU application as if they are stored in linear arrays. Linearization of many different kinds of resources may be supported in one embodiment, as well as partial linearization. Mechanisms for implementing cache-coherent linearization and for optimizing the required TLBs may also be provided.

A set of multi-vendor standard swizzle formats are being standardized in graphics APIs that use 64 KB or 4 KB per swizzled tile. In order to make the tile shape as square (or cubical) as possible, different swizzle variants are needed for each pixel size (8-bit to 128-bit) and each array type (2D, 3D). For 2D arrays, the formats also support 2, 4, 8, or 16 samples per pixel, in two variants optimized for multi-sampled color and multi-sampled depth/stencil data.

Other swizzle patterns may be defined including a more efficient 3D swizzle pattern. An 8-bit swizzle-format field can accommodate all of these alternatives with room for future expansion. A page system with 128-bit page table entries (PTEs) may provide room for such a field.

All of the currently standardized swizzle formats use the same data format within each cacheline, as illustrated in the left most column in FIG. 1. The data format consists of 16 linear bytes from each of four scanlines, divided into pixels based on the pixel size namely 128 bits and 32 bits. As a result, accessing a linear cacheline requires reordering the address bits and then assembling 16B from each of four swizzled cachelines. Other patterns of swizzled data within cachelines may be supported in some embodiments.

A page walk may linearize a swizzled resource while doing the virtual to physical translation. In the absence of SVM, GPUs generally use reserved regions of physical memory, with resource mapping managed by the user-mode driver. Linearization may be enabled by storing a swizzle-format field in each page table entry (PTE). However, a more typical implementation performs the linearizing page table walk to a process virtual address that the operating system (OS) kernel maps to physical memory.

Figure 4:
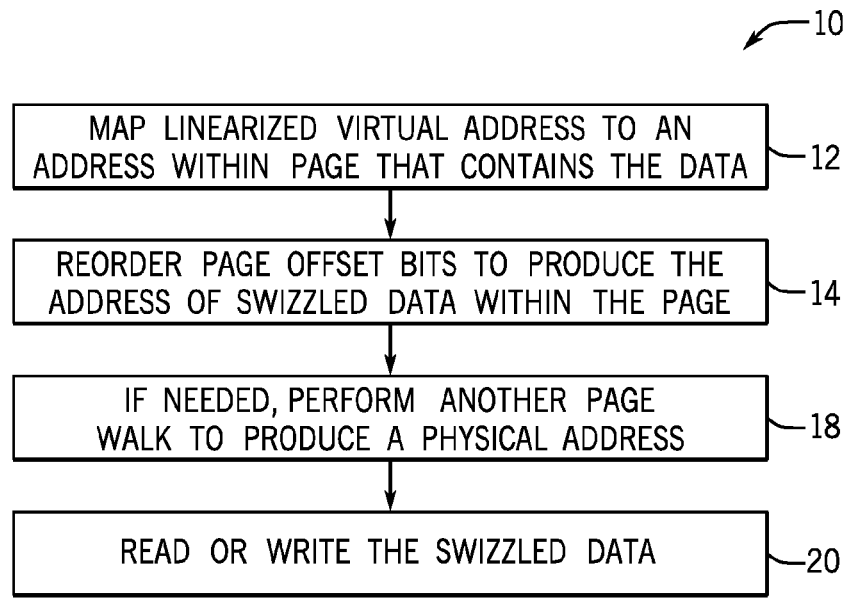
FIG. 4 is a flow chart for one embodiment.

Referring to FIG. 4, a sequence 10 may be implemented in hardware or using a mix of software, firmware and hardware In software and firmware embodiments, the sequence may be implemented by computer executed instructions stored in one or more non-transitory computer readable media such as optical, semiconductor or a magnetic storage. The sequence may be implemented by a central processing unit.

The first step (block 12) is a page translation that maps each linearized virtual address to an address within the page that contains the data. The linearized virtual pages are the same size as the number of bytes in a swizzled page that are contained in a single scanline. For example, a 64 KB tile that stores 128×128 32-bit pixels stores 128*4=512 linear bytes per scanline. Using 512 byte linearized pages allows each linearized address to map to the correct process virtual page, which in turn allows it to map to the correct physical page.

FIG. 2 illustrates how this works in a simplified case of a 16-wide array of 32-bit pixels. Each box represents 4 horizontally adjacent pixels. On the left, two of the 512 byte pixel linearizing pages are shown. The figure on the right represents a page of swizzled data. Each 512 byte page on the left maps to a 512 byte region of the swizzled page.

The page walk maps each linearized page to the addresses it would occupy if pixels were stored in linear form within the swizzled page. So the second step (FIG. 4, block 14) is to reorder the page offset bits to produce the address(es) of the swizzled data within that page. A scalar access maps to a scalar within a single swizzled cacheline. For these swizzle patterns, a 64 byte linearized cacheline maps to 16 bytes in each of four different swizzled cachelines.

If the swizzled data is stored in physical memory dedicated to the GPU, then box 12 maps to a physical page and the address(es) produced in 14 may be used to access the memory, as shown in box 20. If either SVM or Tiled Resources are being used, boxes 12 maps to a virtual page and another page walk is required after box 14 to find a physical address, as shown in box 18. This requires that the linearizing page table entries are able to store either a physical address or a virtual address.

Specifying whether the final address of the linearizing walk is virtual or physical could be done using defined address regions. A more flexible solution is to provide a bit in the PTE that specifies whether the page address is physical or virtual. If that bit is set, another page walk is performed on the virtual address produced by linearization. The swizzle-format can be stored in the leaf PTEs of the linearizing walk and saved during the second page walk so that it can be used to swizzle the physical address. Alternately, the swizzle could be stored in the final page walk, with the PTEs in the linearizing walk storing fact that linearization must be performed.

A tiled resource, shown in FIG. 3, uses a user-mode translation table to map "tiles" of a graphics resource into slots in a tile pool, which stores the application's working set. The tile pool can be in dedicated physical memory or can be managed using SVM. FIG. 3 shows an example of such a mapping. Tiles the application does not map to the Tile Pool are called Null tiles: (indicated by the letter N in FIG. 3) they read as zero and ignore writes The linearizing page tables and the tiled resource page tables can themselves can be accessed using virtual addresses. This allows the application or a user-mode driver to create these pages. If they are physically addressed in system memory, then the OS kernel must create them. The virtual bit described above can be used in earlier walks to specify that the address pointing to a page table is virtual. The top level page translation would specify one or more virtual table addresses, so that the rest of the walk can be controlled by the application. For security, a fault must occur if an OS-managed physical address is produced by a virtually addressed page table.

Translation tables in virtual memory may perform well provided that the translation look aside buffers (TLBs) convert most page addresses without performing the page walk. Alternatively, the memory manager could use a parallel set of physical page tables controlled by the OS kernel. The final table would be shared. Application changes to the other virtual tables would need to be copied into the physical tables by the OS kernel.

Null tiles may be specified by a bit in the page table entry or may be supported by the OS kernel reserving a virtual page address to indicate nulls. In the latter case, the page walk compares virtual addresses to this value in order to identify null tiles (and null page tables, which map all of their pages to null). Alternately, a bit in the page table entries may be used. Cache coherency requires marking null cachelines, so that writes to such cachelines can be ignored.

Tile pools can be linearized using the virtual resource linearization method. Tiled resources also use that method, except that the resulting virtual address is a tiled resource address, which triggers two more page walks. The linearization tables could be mapped in virtual address space to allow the application to modify the type of linearization to be performed without support from the OS kernel.

Another option is to linearize a surface down to some granularity, e.g. 64 B, 256 B or 1 KB. This retains the 2D or 3D footprint provided at the low end of the swizzling pattern. As a result, both CPU applications and GPU engines can take advantage of 2D or 3D locality of access without needing swizzle logic for larger memory units. Instead, they could compute linear addresses down to the desired granularity.

Partial linearization is dramatically more cache and bandwidth efficient than full linearization. It maps each linearized cacheline address to just one swizzled cacheline address. Further, it allows the page size in the linearization walk to be the same as the swizzled tile size. Therefore the page table overhead required for linearization is smaller.

Partially linearized data may be stored in caches near the processor, so that accesses that hit in these caches occur at full speed. These cache entries are tagged with the swizzle-format and level of partial linearization, as obtained from the page walk or TLB lookup. To save area, these tags could be stored for a subset of the cache entries some of the sets, which would be the only cache entries that can store linearized cachelines.

The swizzle conversion occurs at a point in the cache hierarchy that has only write-through caches nearer to the processor. When a linearized access reaches that point, logic uses the swizzle format and linearization tags to swizzle the address and data in order to access the lower-level cache.

Figure 5:
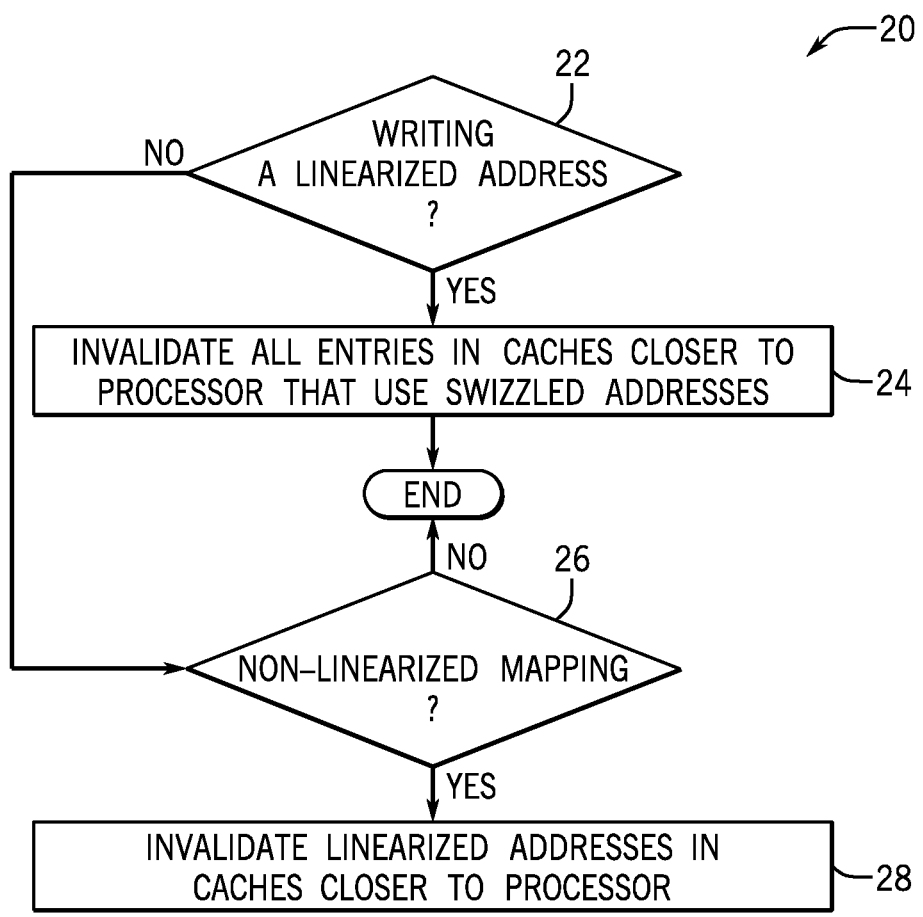
FIG. 5 is a flow chart for another embodiment.

Referring to FIG. 5, a sequence 20 may be implemented by the cache logic hardware. Cache coherency can be guaranteed as shown in FIG. 5. When writing a linearized address (diamond 22), invalidate all entries in caches closer to the processor that use any of the corresponding swizzled addresses (diamond 24), as well as performing the usual invalidates for the linearized address. When writing a non-linearized address that has a linearized mapping associated with it (diamond 26), invalidate the corresponding linearized addresses in all caches closer to the processor (diamond 28).

As a result, any given cacheline is stored in the near caches in only one form: either swizzled or (partially) linearized. As usual, invalidates are only necessary for cachelines marked as shared in the lower level cache. The lower level cache tags the data with which kind of (partial) linearization is being used, so that the correct addresses can be generated when passing invalidate command to caches nearer the processor.

With 64 KB pages, the four swizzled cachelines needed to fill a linearized cacheline are always in the same page. With 4 KB pages, this is true for all of the single-sampled swizzles, but not for some of the color multi-sample swizzles. If required, 4 KB multi-sample swizzles could be supported by replacing the single cacheline access with four separate 16 B accesses. Scalar accesses always translate to a single 64 B cacheline.

Another implementation issue involves translation lookaside buffers (TLBs). When the OS kernel invalidates the virtual to physical mapping of a later walk, it is also necessary to invalidate any TLBs that map to that physical address from a virtual address in an earlier walk. This can be solved for guest/host accesses by storing both virtual addresses in the same TLB and allowing a content addressable memory (CAM) match on either one. It is not practical to extend that solution to cover potentially two extra walks.

One solution is to redesign the TLBs so that the CAM can select either the physical or virtual address. This makes it possible to compare against the invalidated physical address and in one step to find (and invalidate) all TLBs that map to that address. The normal virtual address CAM match against a virtual address to find a physical address also works when using this method.

This method increases area, since the separate physical address RAM must be integrated into the logic that stores the virtual address and comparators. But it does not increase latency through the CAM logic, provided a bubble is inserted between doing CAM matches and doing invalidates. That is because the multiplexor input that selects between a virtual and physical comparison only changes when changing between the two usage modes. As a result, a sequence of accesses in the same usage mode doesn't require additional latency through the multiplexor.

This method also allows using the TLBs in new ways. Currently the TLBs can only map a virtual address to a physical address. For these multi-walk usages, it may be desirable to also store a TLB entry for the virtual to virtual translation. Such a TLB would not need to be invalidated when the virtual to physical mapping is changed, but only when the virtual to virtual translation changes. Invalidating based on the physical address would not invalidate such intermediate TLB entries. They would be invalidated by a comparison against the virtual address that they produce.

Compared with existing solutions, some embodiments have the following advantages:
1) An unlimited number of swizzled resources may be supported. Aperture registers support only a limited number of pixel arrays, allocated globally. They are used by the graphics driver but in general cannot be used within applications due to sharing a limited number of them across all processes.
2) Caching the data is allowed, so that the multiple memory reads needed for a single linear cacheline can be reused. Apertures require using uncached space, since the linear address within a given aperture is converted to other memory addresses without providing cache coherency.

3) The use of SVM allows GPU and CPU accesses to be intermixed with no latency. Linearizing copies require a large latency between CPU and GPU accesses. Aperture accesses do not support SVM.
4) This invention supports existing applications and makes it simple to write new applications that access graphics data arrays. Supporting swizzles with explicit CPU code only works for new applications and is too complex to use except in specialized cases, mostly involving individual tile operations.
5) Some embodiments support multi-vendor standardized swizzle patterns.

Figure 6:
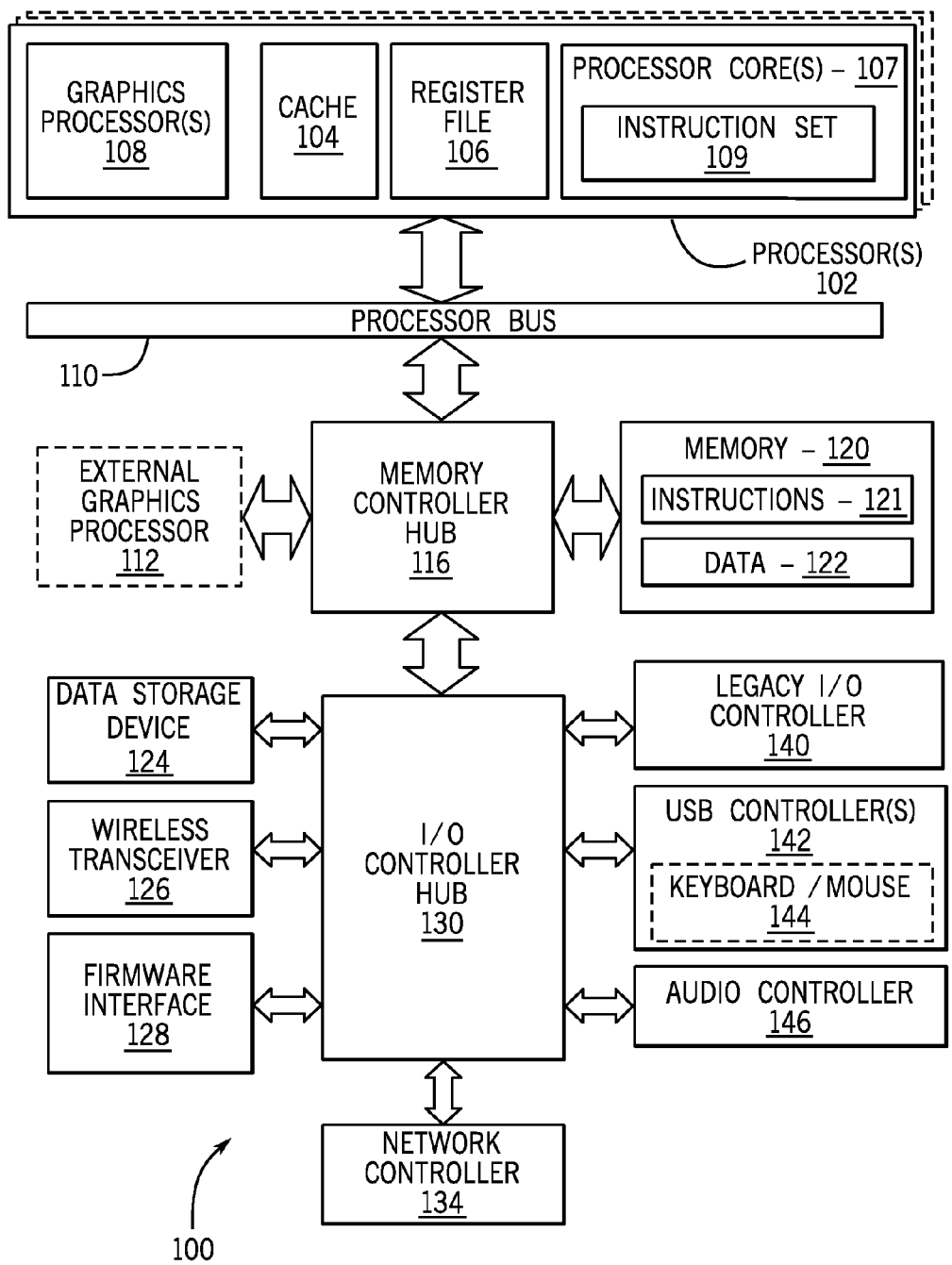
FIG. 6 is a block diagram of a processing system according to one embodiment.

FIG. 6 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 7:
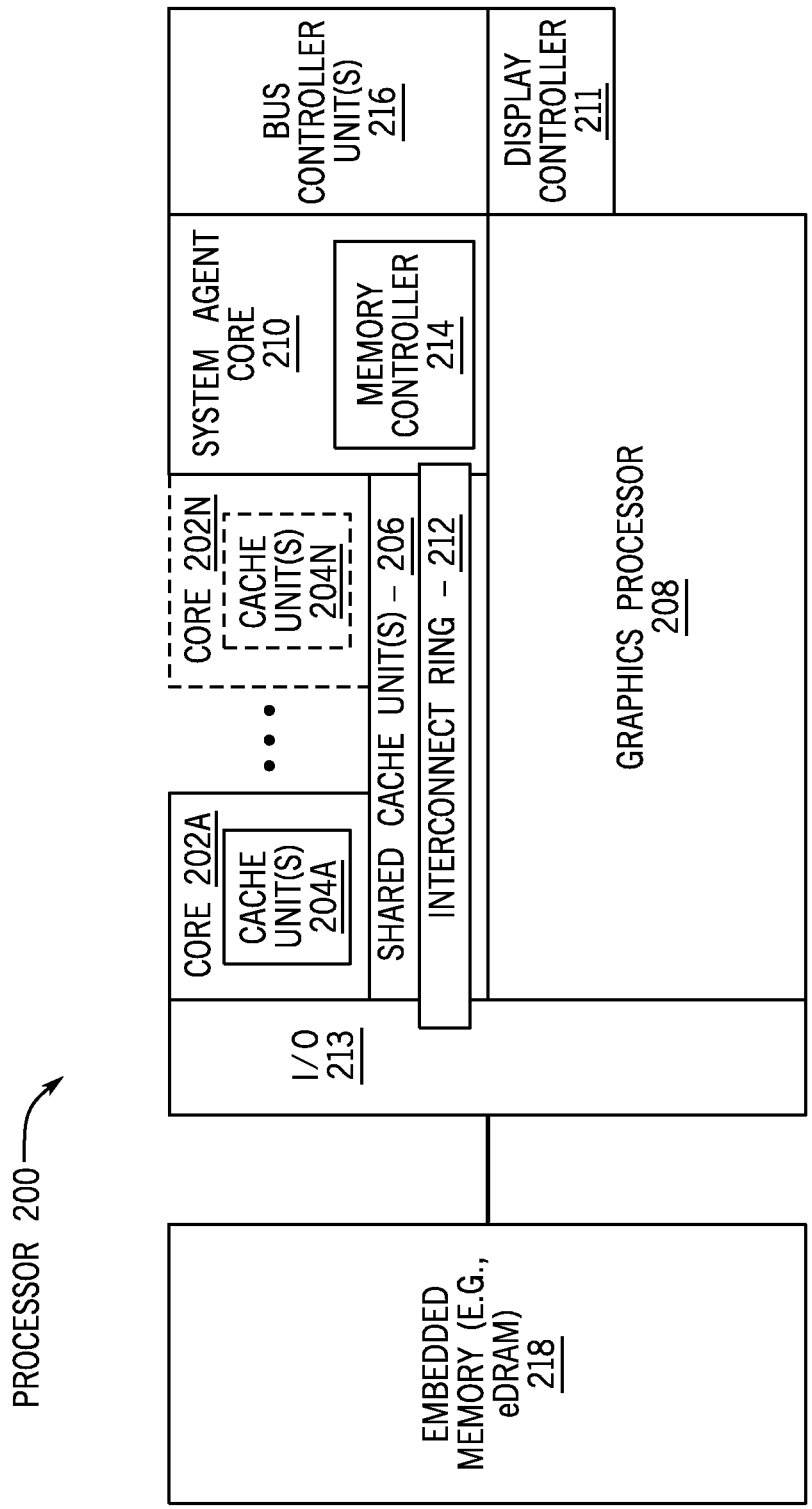
FIG. 7 is a block diagram of a processor according to one embodiment.

FIG. 7 is a block diagram of an embodiment of a processor 200 having one or more processor cores 202A-202N, an integrated memory controller 214, and an integrated graphics processor 208. Those elements of FIG. 7 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 8:
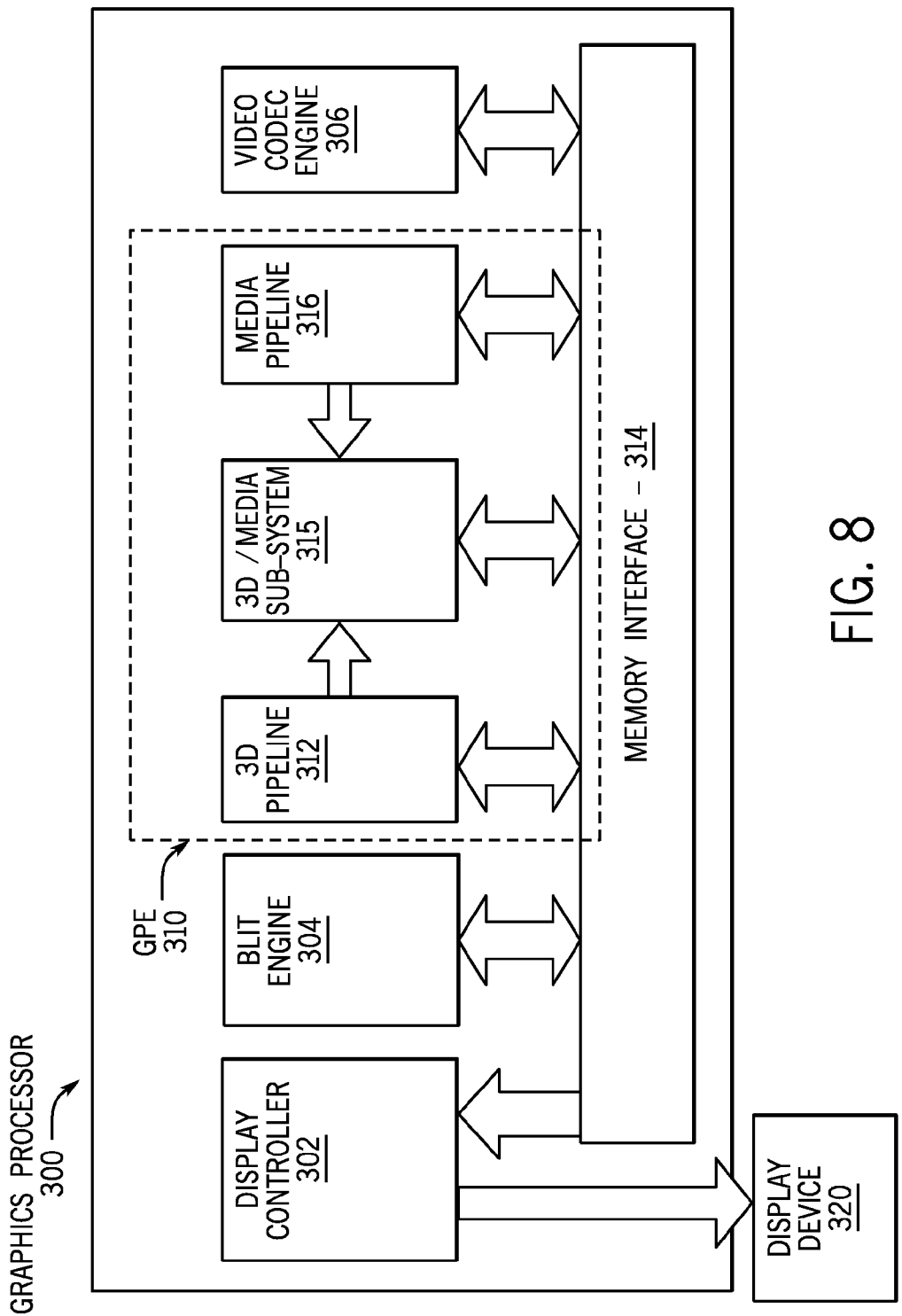
FIG. 8 is a block diagram of a graphics processor according to one embodiment.

FIG. 8 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Figure 9:
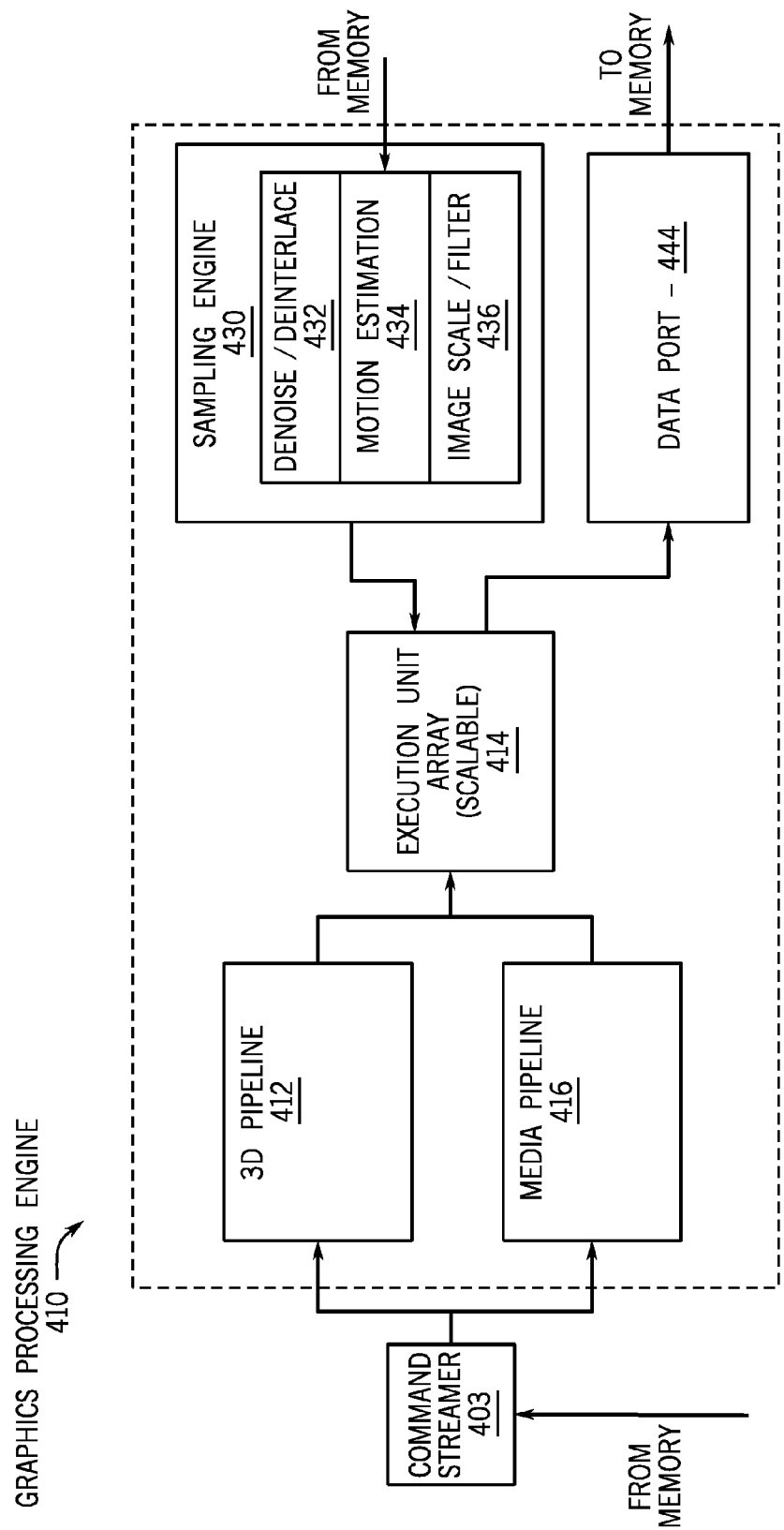
FIG. 9 is a block diagram of a graphics processing engine according to one embodiment.

FIG. 9 is a block diagram of a graphics processing engine 410 of a graphics processor in accordance with some embodiments. In one embodiment, the GPE 410 is a version of the GPE 310 shown in FIG. 8. Elements of FIG. 9 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Figure 10:
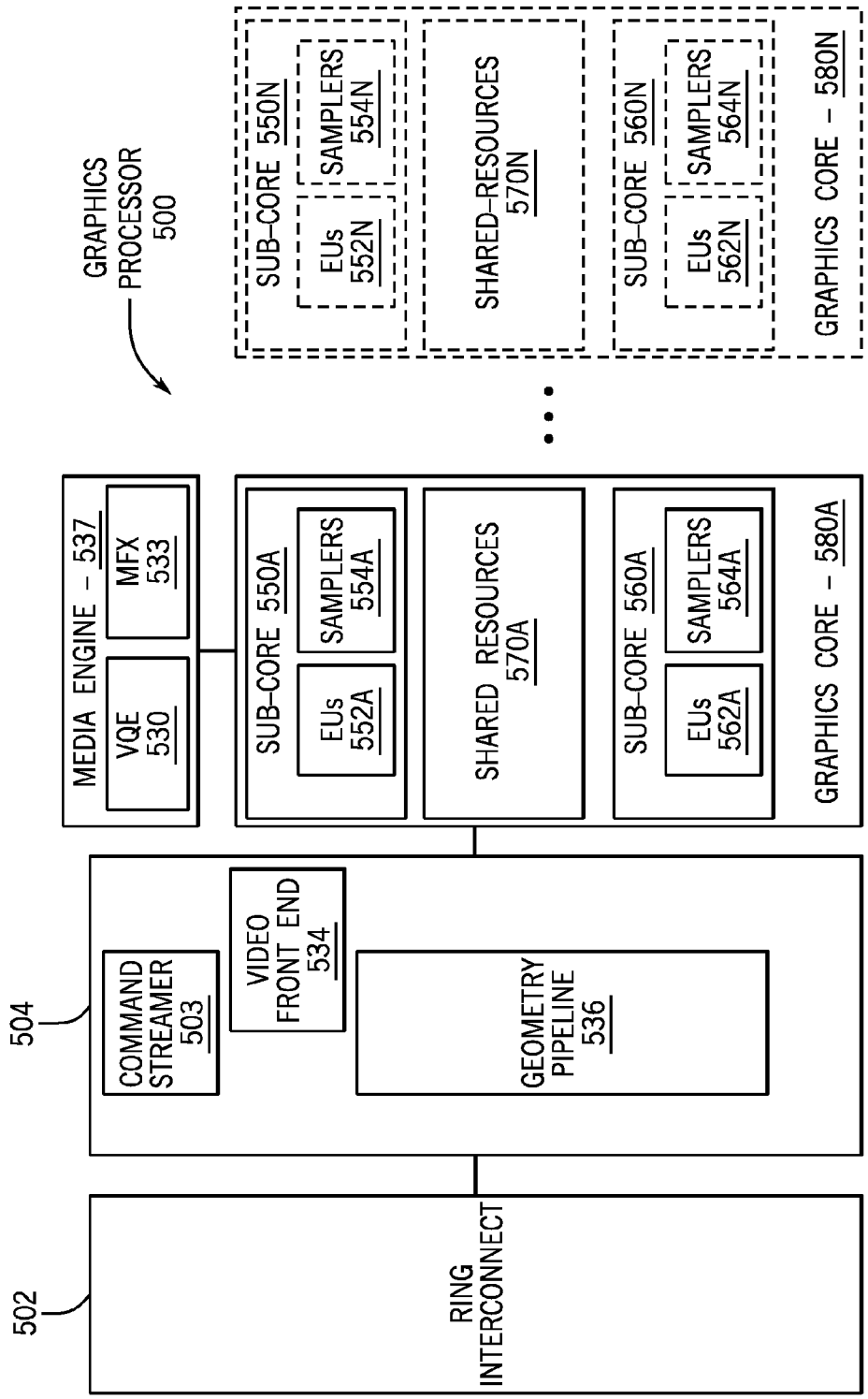
FIG. 10 is a block diagram of another embodiment of a graphics processor.

FIG. 10 is a block diagram of another embodiment of a graphics processor 500. Elements of FIG. 10 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 11:
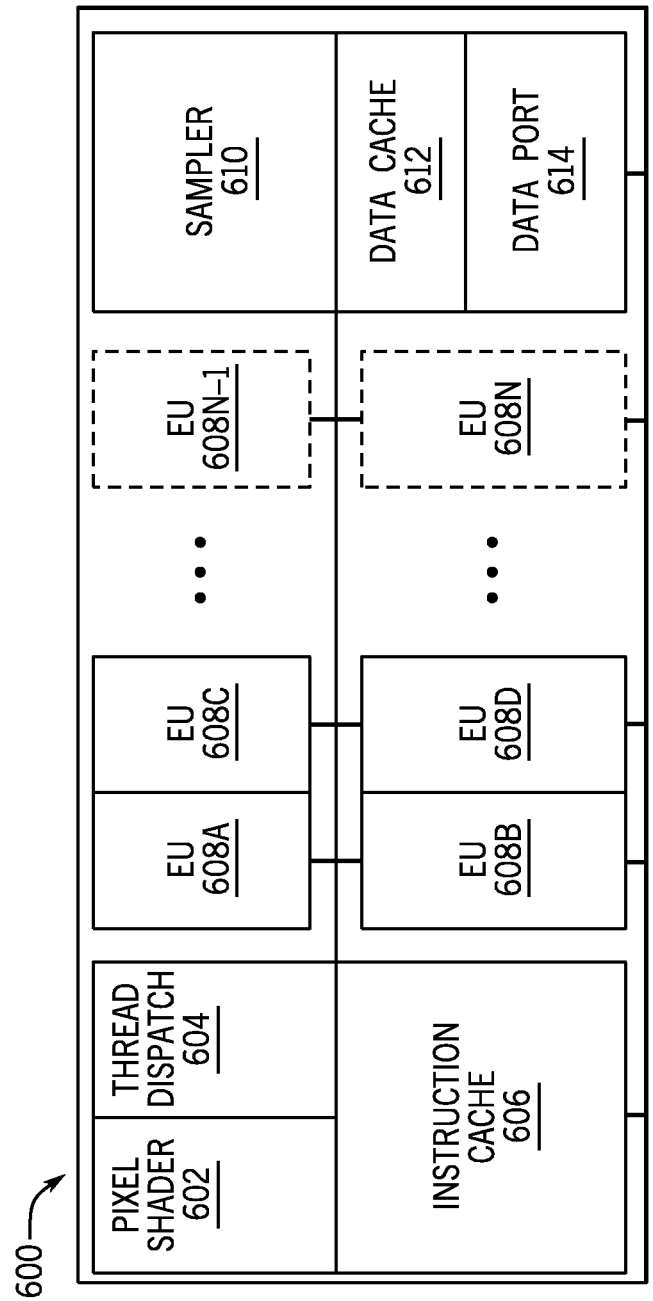
FIG. 11 is a depiction thread execution logic according to one embodiment.

FIG. 11 illustrates thread execution logic 600 including an array of processing elements employed in some embodiments of a GPE. Elements of FIG. 11 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 10) dispatches vertex processing, tessellation, or geometry processing threads to thread execution logic 600 (FIG. 11). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 12:
FIG. 12 is a block diagram of a graphics processor instruction format according to some embodiments.
Figure 12:
Figure 12:
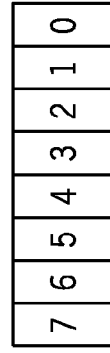
Figure 12:
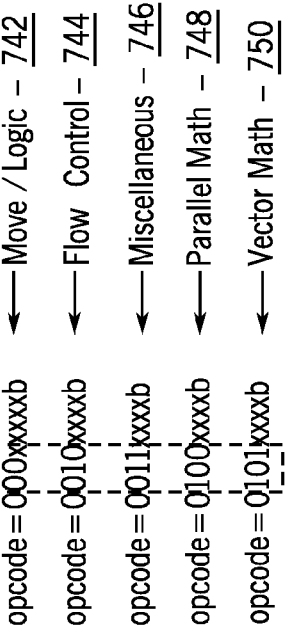

FIG. 12 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 13:
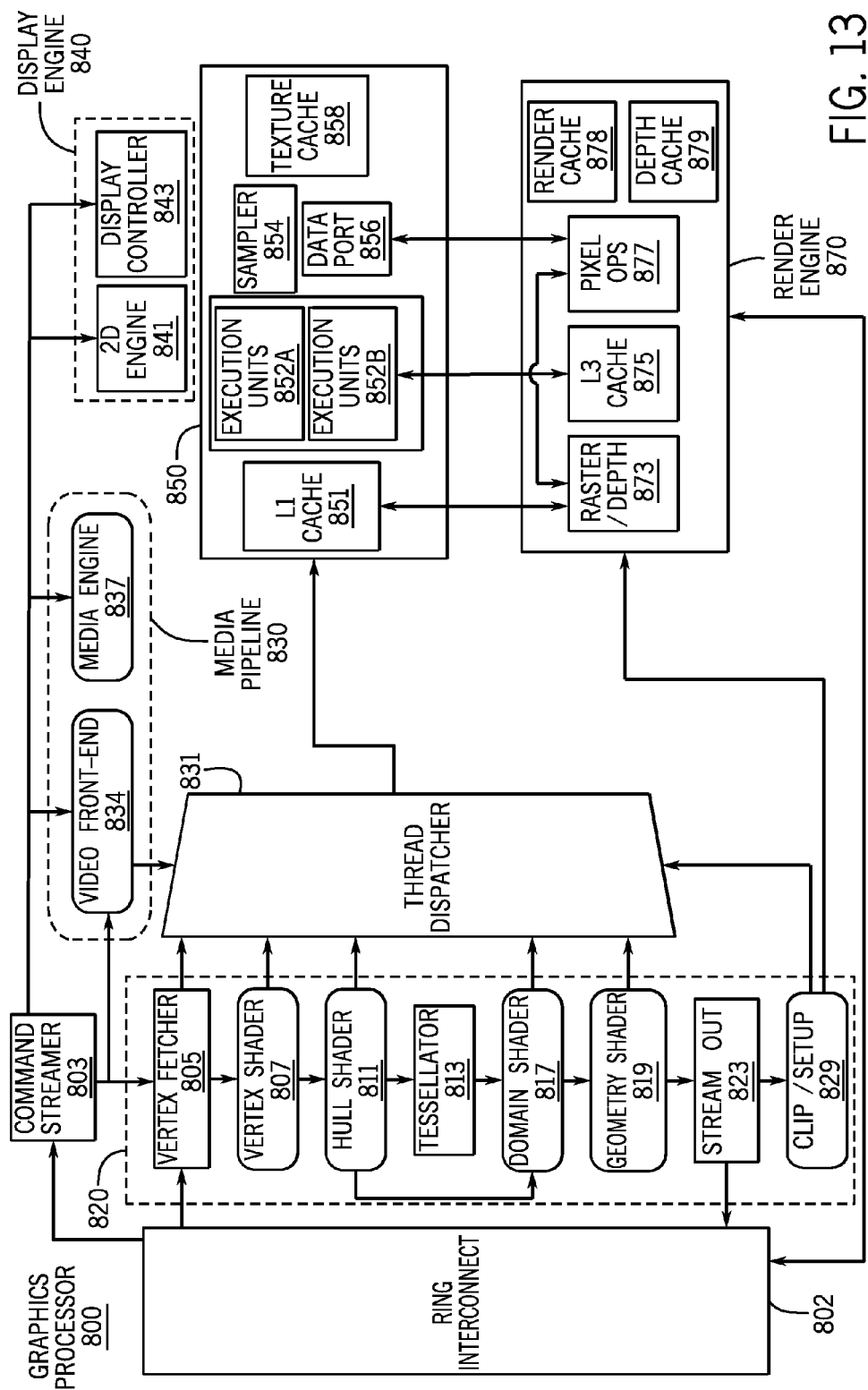
FIG. 13 is a block diagram of another embodiment of a graphics processor.

FIG. 13 is a block diagram of another embodiment of a graphics processor 800. Elements of FIG. 13 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer/depth 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 14A:
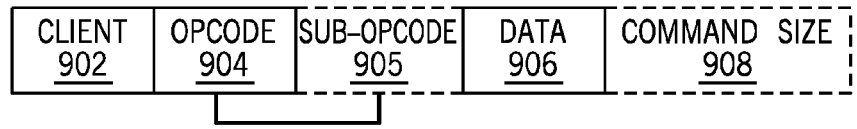
FIG. 14A is a block diagram of a graphics processor command format according to some embodiments.
Figure 14B:
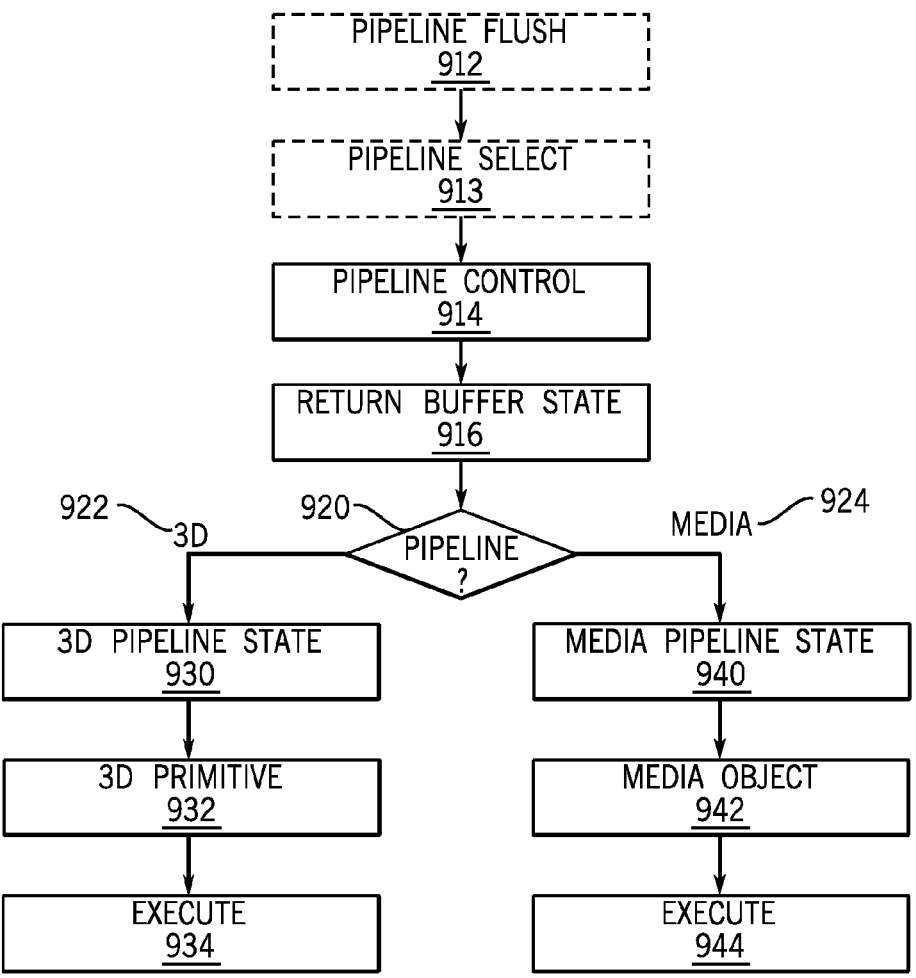
FIG. 14B is a block diagram illustrating a graphics processor command sequence according to some embodiments.

FIG. 14A is a block diagram illustrating a graphics processor command format 900 according to some embodiments. FIG. 14B is a block diagram illustrating a graphics processor command sequence 910 according to an embodiment. The solid lined boxes in FIG. 14A illustrate the components that are generally included in a graphics command while the dashed lines include components that are optional or that are only included in a sub-set of the graphics commands. The exemplary graphics processor command format 900 of FIG. 14A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 14B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Figure 15:
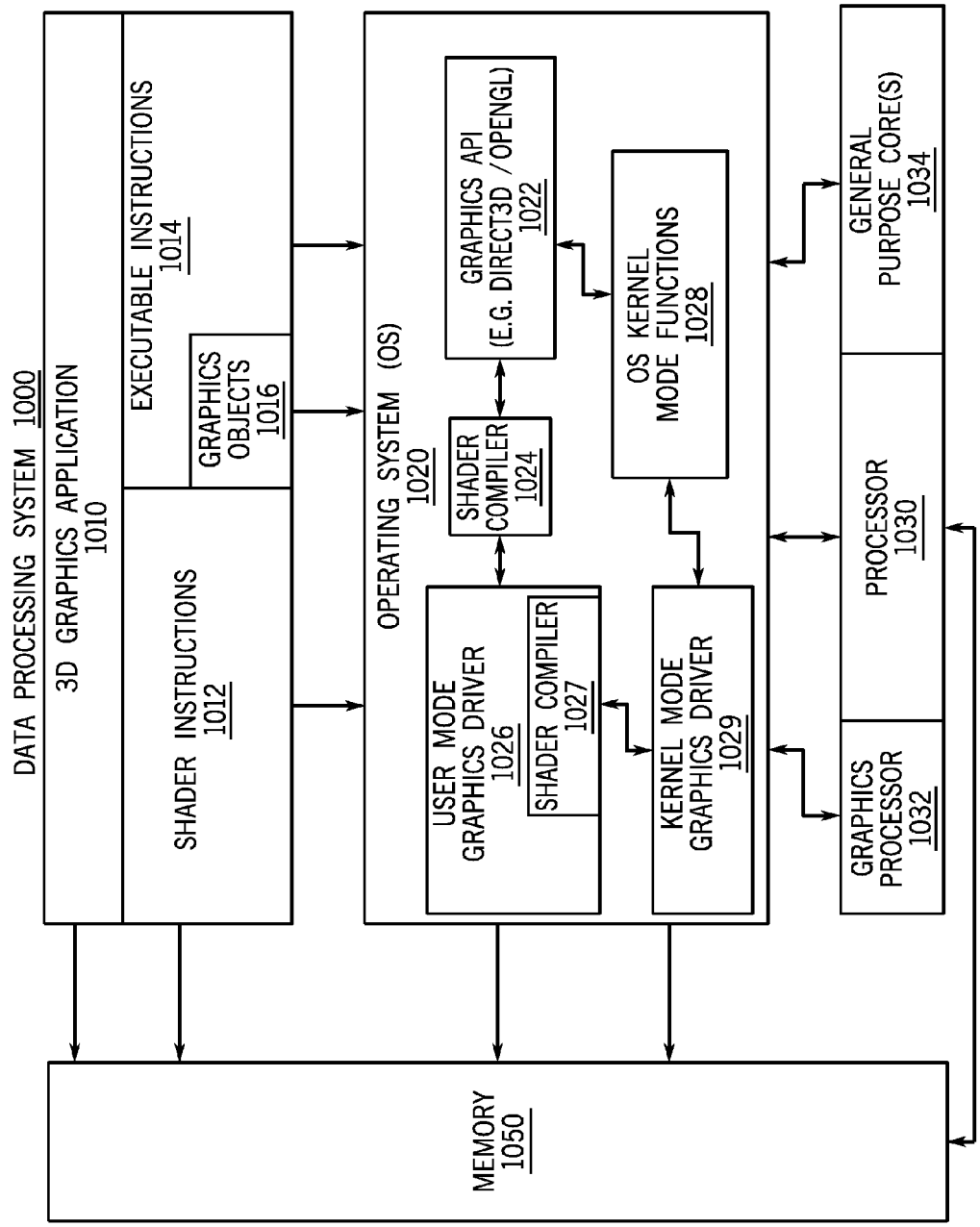
FIG. 15 is a depiction of an exemplary graphics software architecture according to some embodiments.

FIG. 15 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 16:
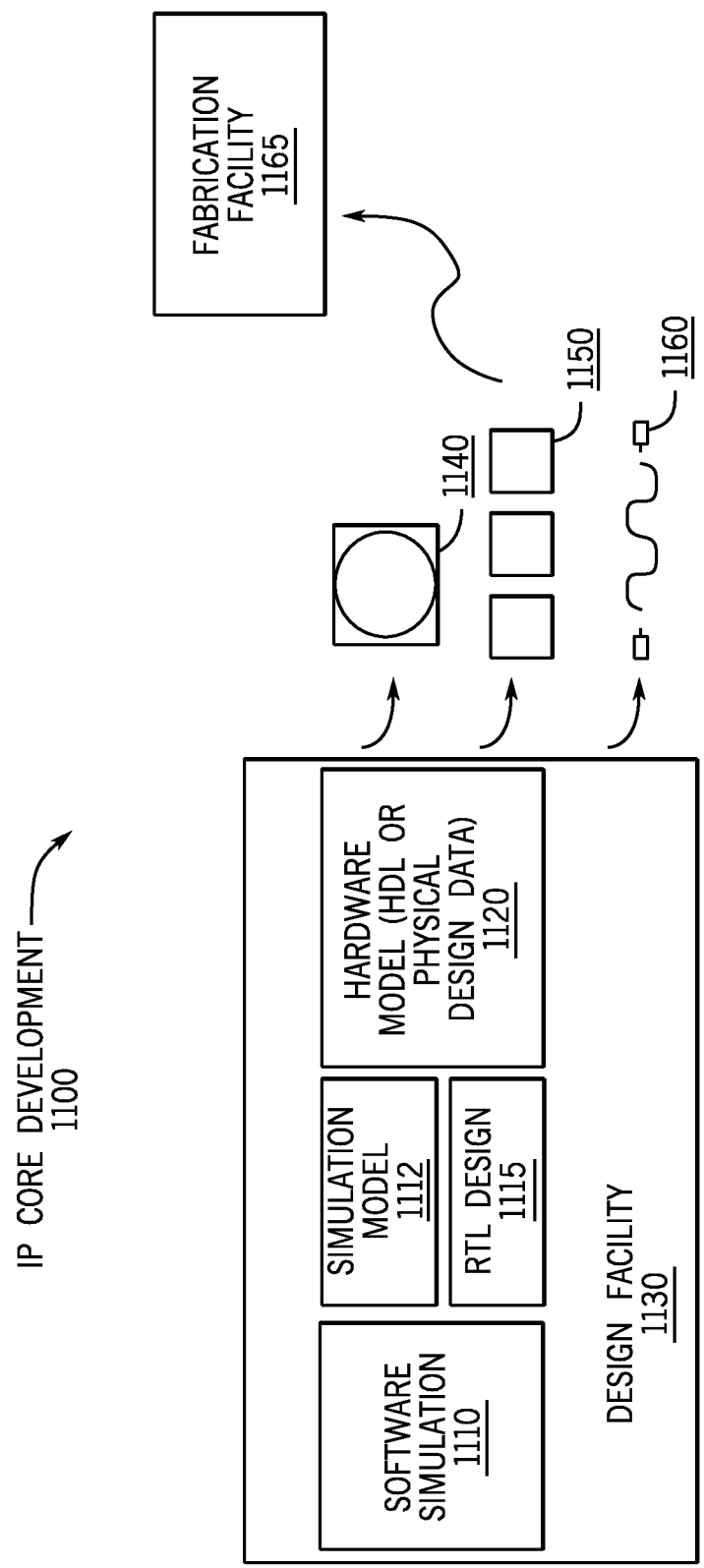
FIG. 16 is a block diagram illustrating an IP core development system according to some embodiments.

FIG. 16 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 17:
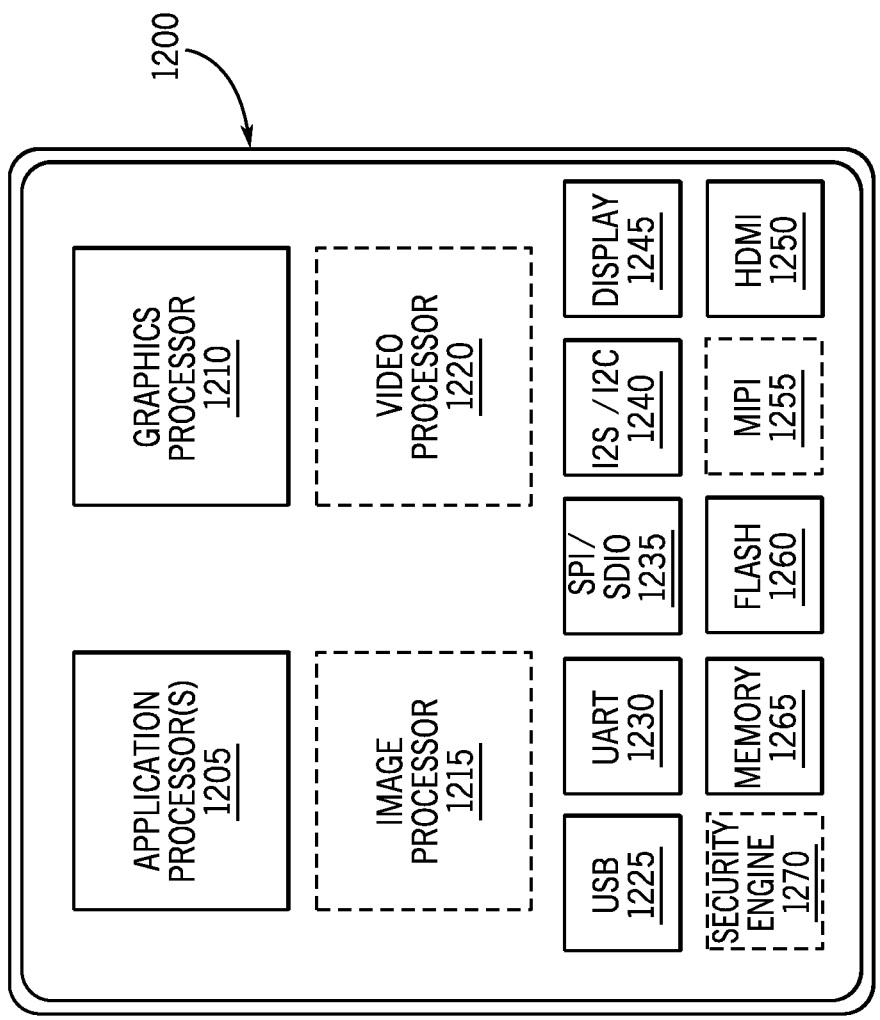
FIG. 17 is a block diagram showing an exemplary system on chip integrated circuit according to some embodiments.

FIG. 17 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

The following clauses and/or examples pertain to further embodiments:

One example embodiment may be a method comprising accessing memory resources stored in graphics processor using an application running on a central processing unit, and performing swizzling translations of the graphics processor-specific formats on said central processing unit. The method may also include performing a first page table walk to map a virtual address of the resource to a virtual page that contains swizzled data. The method may also include storing the data in caches with a physical address tagged with a swizzle-format field. The method may also include using tag bits on non-linearized entries to indicate whether there is a linear mapping for the virtual address. The method may also include swizzling before any write-back caches. The method may also include using cacheline tags to perform data conversion. The method may also include supporting user-mode for tiled resource translation using a second page table walk after the first page table walk to specify swizzle translation. The method may also include invalidating all entries in caches closer to central processing unit that use any corresponding swizzled address. The method may also include invalidating the corresponding linearized addresses in all caches closer to the central processing unit when writing a non-linearized address that has associated linearized addresses. The method may also include using a translation lookaside buffer content addressable memory that matches on either a virtual or physical address.

Another example embodiment may be at least one or more non-transitory computer readable media storing instructions executed to perform a sequence comprising accessing memory resources stored in graphics processor using an application running on a central processing unit, and performing swizzling and tiled rendering translators of the GPU-specific formats on said central processing unit. The media may include said sequence including performing a first page table walk to map a virtual address of the resource to a virtual page that contains swizzled data. The media may include said sequence including storing the data with a physical address tagged with a swizzle-format field. The media may include said sequence including using tag bits on non-linearized entries to indicate whether there is a linear mapping for the virtual address. The media may include said sequence including swizzling before any write-back caches. The media may include said sequence including using cacheline tags to perform data conversion. The media may include said sequence including support user-mode tiled resource translation using a second page table walk after the first page table walk to produce a virtual address. The media may include said sequence including invalidating all entries in caches closer to central processing unit that use any corresponding swizzled address. The media may include said sequence including invalidating the corresponding linearized addresses in all caches closer to the central processing unit when writing a non-linearized address that has associated linearized addresses. The media may include said sequence including accessing data from a shared virtual memory used by the central processing unit and a graphics processing unit.

In another example embodiment may be an apparatus comprising a processor to access memory resources stored in graphics processor using an application running on a central processing unit, perform swizzling and tiled rendering translators of the GPU-specific formats on said central processing unit, and a storage coupled to said processor. The apparatus may include said processor to perform a first page table walk to map a virtual address of the resource to a virtual page that contains swizzled data. The apparatus may include said processor to store the data with a physical address tagged with a swizzle-format field. The apparatus may include said processor to use tag bits on non-linearized entries to indicate whether there is a linear mapping for the virtual address. The apparatus may include said processor to swizzle before any write-back caches. The apparatus may include said processor to use cacheline tags to perform data conversion. The apparatus may include said processor to support user-mode tiled resource translation using a second page table walk after the first page table walk to produce a virtual address. The apparatus may include said processor to invalidate all entries in caches closer to central processing unit that use any corresponding swizzled address. The apparatus may include said processor to invalidate the corresponding linearized addresses in all caches closer to the central processing unit when writing a non-linearized address that has associated linearized addresses. The apparatus may include said processor to access data from a shared virtual memory used by the central processing unit and a graphics processing unit.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   accessing a memory resource, not stored in a linear way, stored in a graphics processor in a graphics processor-specific format, using an application running on a central processing unit wherein a graphics processor specific format uses interleaved X and Y address bits and supports tiled resources to map portions of the memory resource to process virtual addresses; and
   performing swizzling translations of the graphics processor-specific format not using a linear array on said central processing unit so that said central processing can directly access said graphics processor-specific format using a linearization page table walk to map a virtual address to a virtual page that contains swizzled data; and
   supporting tiled resources by using an additional page table walk after the linearization on page table walk.

2. The method of claim 1 including performing a first page table walk to map a virtual address of the resource to a virtual page that contains swizzled data.

3. The method of claim 2 including supporting user-mode for tiled resource translation using a second page table walk after the first page table walk to specify swizzle translation.

4. The method of claim 1 including storing the data in caches with a physical address tagged with a swizzle-format field.

5. The method of claim 4 including swizzling before any write-back caches.

6. The method of claim 5 including using cacheline tags to perform data conversion.

7. The method of claim 1 including using tag bits on non-linearized entries to indicate whether there is a linear mapping for the virtual address.

8. The method of claim 1 including invalidating all entries in caches closer to central processing unit that use any corresponding swizzled address.

9. The method of claim 1 including invalidating the corresponding linearized addresses in all caches closer to the central processing unit when writing a non-linearized address that has associated linearized addresses.

10. The method of claim 1 including using a translation lookaside buffer content addressable memory that matches on either a virtual or physical address.

11. One or more non-transitory computer readable media storing instructions executed to perform a sequence comprising:
  accessing a memory resource, not stored in a linear array, stored in a graphics processing unit (GPU) in a graphics-processor specific format, using an application running on a central processing unit wherein a graphics processor specific format uses interleaved X and Y address bits and supports tiled resources to map portions of the memory resource to process virtual addresses; and
  performing swizzling of the GPU-specific format not using a linear array on said central processing unit so that said central processing can directly access said graphics processor-specific format using a linearization page table walk to map a virtual address to a virtual page that contains swizzled data; and
  supporting tiled resources by using an additional page table walk after the linearization on page table walk.

12. The media of claim 11, said sequence including performing a first page table walk to map a virtual address of the resource to a virtual page that contains swizzled data.

13. The media of claim 12, said sequence including storing the data with a physical address tagged with a swizzle-format field.

14. The media of claim 13, said sequence including using tag bits on non-linearized entries to indicate whether there is a linear mapping for the virtual address.

15. The media of claim 12, said sequence including swizzling before any write-back caches.

16. The media of claim 15, said sequence including using cacheline tags to perform data conversion.

17. The media of claim 12, said sequence including support user-mode tiled resource translation using a second page table walk after the first page table walk to produce a virtual address.

18. The media of claim 11, said sequence including invalidating all entries in caches closer to central processing unit that use any corresponding swizzled address.

19. The media of claim 11, said sequence including invalidating the corresponding linearized addresses in all caches closer to the central processing unit when writing a non-linearized address that has associated linearized addresses.

20. The media of claim 11, said sequence including accessing data from a shared virtual memory used by the central processing unit and the graphics processing unit.

21. An apparatus comprising:
  a processor to access memory resource not stored in a linear array, stored in a graphics processing unit (GPU) in a graphics processor-specific format, using an application running on a central processing unit wherein a graphics processor specific format uses interleaved X and Y address bits and supports tiled resources to map portions of the memory resource to process virtual addresses, perform swizzling of the GPU-specific format not using a linear array on said central processing unit so that said central processing can directly access said graphics processor-specific format use a linearization page table walk to map a virtual address to a virtual page that contains swizzled data, and support tiled resources by using an additional page table walk after the linearization on page table walk; and
  a storage coupled to said processor.

22. The apparatus of claim 21, said processor to perform a first page table walk to map a virtual address of the resource to a virtual page that contains swizzled data.

23. The apparatus of claim 22, said processor to store the data with a physical address tagged with a swizzle-format field.

24. The apparatus of claim 23, said processor to use tag bits on non-linearized entries to indicate whether there is a linear mapping for the virtual address.

25. The apparatus of claim 22, said processor to swizzle before any write-back caches.

26. The apparatus of claim 25, said processor to use cacheline tags to perform data conversion.

27. The apparatus of claim 22, said processor to support user-mode tiled resource translation using a second page table walk after the first page table walk to produce a virtual address.

28. The apparatus of claim 21, said processor to invalidate all entries in caches closer to the central processing unit that use any corresponding swizzled address.

29. The apparatus of claim 21, said processor to invalidate the corresponding linearized addresses in all caches closer to the central processing unit when writing a non-linearized address that has associated linearized addresses.

30. The apparatus of claim 21, said processor to access data from a shared virtual memory used by the central processing unit and the graphics processing unit.

* * * * *